UNITED STATES PATENT OFFICE.

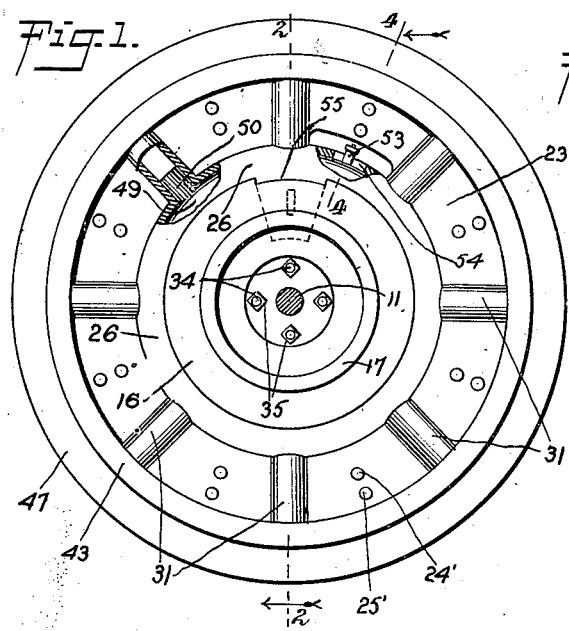

HIRAM C. ANDERSON, OF NEW YORK, N. Y.

RESILIENT WHEEL.

1,342,271. Specification of Letters Patent. Patented June 1, 1920.

Application filed April 16, 1919. Serial No. 290,599.

*To all whom it may concern:*

Be it known that I, HIRAM C. ANDERSON, a citizen of the United States, and a resident of the city of New York, Westchester, borough of the Bronx, in the county of Bronx and State of New York, have invented a new and Improved Resilient Wheel, of which the following is a full, clear, and exact description.

This invention relates to resilient wheels of the character covered by Letters Patent of the United States No. 1,239,333, issued to me on the 4th day of September, 1917, and has for its objects the formation of a wheel of a very compact simple and reliable nature and one which possesses all of the resilient qualities of a wheel having a pneumatic tire.

Another object of the invention is to provide what is the equivalent of a pneumatic hub for a wheel whereby the pneumatic cushioning means are so placed and guarded as to be practically indestructible in so far as traction or contact with the ground are concerned.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which—

Figure 1 is a side elevation of my improved wheel looking outward from the vehicle body with parts broken away to show the resilient locking lugs and the valve stem.

Fig. 2 is an enlarged vertical section on the line 2—2 of Fig. 1.

Fig. 3 is a partial elevation and partial section on the line 3—3 of Fig. 2 indicating special means for limiting the extent of relative rotation between the inner and outer hub members.

Fig. 4 is a transverse sectional detail on the line 4—4 of Fig. 1; and

Fig. 5 is a detail plan view of a portion of the inner hub member.

Referring now more specifically to the drawings I show a wheel comprising a sleeve 10 fixed or fitted in any suitable manner upon a spindle or axle 11 as by means of a key 12 and held from slipping therefrom by means of a nut 13 and cotter 14, the holding means being housed within a cap nut 15 screwed on the sleeve. The end of the sleeve remote from the cap 15 carries a disk or plate 16 which may carry a brake hub 17 or other means for controlling the rotation of the wheel.

The hub structure above referred to comprises an inner portion consisting of two mating parts 18 and 19 fitted upon the sleeve and removably connected together by any suitable means such as pin and slot connections 20 and 21, the pins being shown as carried by the member 18 and the slots being formed in the member 19 whereby one part may be removed from the other by giving first a slight rotation thereto and then a movement parallel to the axis of the shaft or axle 11. The outer face portions of the members 18 and 19 constitute a concave seat 22 and the side faces of these hub members are flat and parallel to each other.

The outer hub member comprises a disk member 23 on one side of the wheel and on the opposite side are two disk members 24 and 25 adapted to be rigidly secured to the first mentioned disk member 23 by means of detachable fasteners such as bolts 24′ and 25′ respectively. These outer hub members 23 and 24 are formed adjacent to their inner edges or next to the inner hub member with rounded shoulders 26 and 27 respectively forming an outer seat 28 while the inwardly projecting portions of these members are in the nature of flat rings 29 and 30 respectively which lie against the aforesaid flat faces of the inner hub members and over which they are adapted to lie both circumferentially and radially with respect to the axis of the wheel within such limits as are essential for the desired resiliency of the structure in practice. The disk member 23 is provided with radial sockets 31 having the appearance of spokes. These sockets are substantially cylindrical and are so formed that their axes all lie in the central plane of the wheel while the main portion of the disk carrying such socket members has contact with the members 24 and 25 in a plane spaced laterally from the central plane aforesaid a distance equal to the radius of the socket members.

The inwardly projecting ring portion 29 of the member 23 is provided with a large central opening 32 spaced outward radially from the abutment member 33 carried by the plate 16 and through which abutment member the inner hub member 19 is secured by any suitable means such as bolts 34 having lock nuts 35. Likewise the opposite annulus 30 has a large central opening 36 spaced outward radially from the abutment member 37 formed on or secured to a face plate 38 fitted upon the end of the sleeve 10 adjacent to the cap 15 and substantially of the same size and form as the plate 16. The last mentioned plate 38 and its abutment extension 37 are secured to the inner hub at 18 by bolts 39 having lock nuts 40.

The peripheries of the members 23 and 25 are bent away from each other forming shoulders 41 and 42, thence outward radially from the shoulders forming side flanges 43 and 44 for the purpose of securely locking a suitably formed cushion tire 47, or its equivalent, against the ring shaped rim 48 supported upon or against said shoulders 41 and 42. Access may be had to the rim 48 and the tire for removal or interchange thereof by separating the member 25 from the disk member 23 by loosening the bolts 25'. Even though the plane of connection between the rim members is offset from the center at the central plane of the wheel ample strength and stiffness are afforded by the socket structures 31 in addition to the main portions of the disks.

The pneumatic cushioning means includes an annular shoe 49 having formed upon its periphery an annular series of lugs 50 formed preferably of a good quality of rubber. The inner portion of the lugs 50 comprises portion remote from the lugs 51, the extreme two overlapping portions of which portions is quite thin and terminates in a circumference equal to the center line of the shoe. These overlapping portions of the shoe are adapted to seat in the inner hub member seat 22 while the outer portion of the shoe bears against the outer seat 28 with the lugs 50 projecting into and fitting snugly in the sockets 31. Because of the snug fit of the lugs 50 in their sockets the resiliency of the cushioning means as a whole tends to maintain the inner and outer hub members properly centered with respect to relative circumferential movement and insures a smoother and more satisfactory operation of the wheel than would be possible if there were looseness between the lugs and the socket walls. Within the shoe is an inflatable member or inner tire 52 having a filling nozzle 53 projecting outward through a slot 54 formed in the shoulder portion 26 of the disk member 23.

In assembling the wheel the disk 23 is slipped into place against the plate 16 and the inner hub member 19 is then put in place and locked by means of the bolts 34. The cushioning devices are then inserted bringing the lugs 50 into the sockets 31 and then the other inner hub member 18 is slipped upon the sleeve 10 bringing the overlapping portions of the inner members into registry and then the member 18 is given a slight rotation to cause the interlocking through the bayonet slot connections 20 and 21. The disk member 24 is then put in place over the cushioning devices and the member 18 and secured through the bolts 24' to the disk member 23. The face plate 38 is put into place and locked as above described, and finally the cap 15 is put upon the outer end of the sleeve. By reason of the detachable connecting devices 24' and 25' securing the disk parts 24 and 25 independently of each other to the disk 23 either member 24 or 25 may be detached from the disk 23 without disturbing the connections of the other part. In other words a new tire may be introduced by simply removing the disk member 25, the hub or cushioning members remaining undisturbed or while the tread portions of the wheel remain undisturbed the shoe 49 and parts associated therewith may be inspected, renewed or interchanged upon removing the parts 24, 18 and 38.

In the foregoing assembly of the wheel it is preferred that the hub and disk portions shall be so positioned with respect to one another and the hub sleeve that the periphery of the wheel may be caused to rotate to a certain extent in either direction while the said sleeve and parts connected thereto may remain stationary. It is desirable, however, that the extent of such rotation be limited and consequently I provide the features shown and now to be described. The plate 16 is recessed on its inner face as shown at 55, the recess being directed from the periphery of the plate 16 inward radially to a shoulder 56 and bounded circumferentially by radial faces or shoulders 57. The annular flange portion 29 of the disk 23 is provided adjacent to the face plate 16 with a suitable projection 58 which extends into the recess 55. The lug or projection 58 may be made in any suitable manner but is indicated as being punched outward from the plane of the annulus 29 by a swaging tool so as to constitute an integral part of the flange 29. As may be readily appreciated from Figs. 2 and 3 the lug 58 in its coöperation with either of the shoulders 57 will limit the extent of relative rotation between the tread portions of the wheel and the hub portions, and after the parts have been assembled as above described with the lug 58 substantially central between the shoulders 57 the resiliency of the cushioning members will tend to maintain the wheel in such relation. The lug 58 may be said furthermore to have free floating action in or along any portion of the recess 55 so far as permitted by the resiliency of the cushioning devices and their tendency to hold the lug central.

I claim:

In a resilient wheel, the combination of inner hub means, resilient cushioning means carried by the inner hub means and including a series of radially projecting lugs of cylindrical form and outer hub means co-operating with the resilient cushioning means and comprising two disk members lying in the same plane at one side of the central plane of the cushioning means, another disk member lying flat against said two disk members and including a series of radial cylindrical sockets in which the cushioning means lugs are radially fitted and whose centers lie in said central plane of the cushioning means, and means to secure said disk members together.

HIRAM C. ANDERSON.